United States Patent
Mutalikdesai et al.

(10) Patent No.: US 11,030,228 B2
(45) Date of Patent: Jun. 8, 2021

(54) CONTEXTUAL INTERESTINGNESS RANKING OF DOCUMENTS FOR DUE DILIGENCE IN THE BANKING INDUSTRY WITH TOPICALITY GROUPING

(71) Applicant: International Business Machines Corporation, Armonk, NY (US)

(72) Inventors: Mandar Mutalikdesai, Bengaluru (IN); Arjun Das, Bengaluru (IN); Ratnanu Ghosh-Roy, Buckinghamshire (GB); Sudarsan Lakshminarayanan, Bengaluru (IN); Veerababu Moodu, Bengaluru (IN); Raunak Swarnkar, Gandhinagar (IN); Anagha M, Bengaluru (IN); Shrishti Aggarwal, Delhi (IN); Lavina Durgani, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 16/198,693

(22) Filed: Nov. 21, 2018

(65) Prior Publication Data

US 2020/0159754 A1    May 21, 2020

(51) Int. Cl.
*G06F 16/93* (2019.01)
*G06F 16/33* (2019.01)
(Continued)

(52) U.S. Cl.
CPC ........ *G06F 16/3347* (2019.01); *G06F 16/353* (2019.01); *G06F 16/93* (2019.01); *G06N 5/02* (2013.01); *G06Q 30/0185* (2013.01)

(58) Field of Classification Search
None
See application file for complete search history.

(56) References Cited

U.S. PATENT DOCUMENTS

| 8,417,713 | B1 | 4/2013 | Blair-Goldensohn et al. |
| 9,268,878 | B2 | 2/2016 | Bieniosek et al. |
| | | (Continued) | |

OTHER PUBLICATIONS

IBM, "Watson Retrieve and Rank" [online], retrieved on Nov. 21, 2018,from the Internet URL: https://www.ibm.com/watson/services/retrieve-and-rank/.

(Continued)

*Primary Examiner* — Wilson Lee
(74) *Attorney, Agent, or Firm* — Diana R. Gerhardt; Jack V. Musgrove

(57) ABSTRACT

Documents needing to be analyzed for various reasons, such as financial crimes, are ranked by examining the topicality and sentiment present in each document for a given subject of interest. In one approach a given document is classified to determine its category, and entity recognition is used to identify the subject of interest. Passages from the document that relate to the entity are grouped and analyzed for sentiment to generate a sentiment score. Documents are then ranked based on the sentiment scores. In another approach, a classification probability score is computed for each passage representing a likelihood that the passage relates to a category of interest, and the document is ranked based on the sentiment scores and the classification probability scores. The category classification uses an ensemble of natural language text classifiers. One of the classifiers is a naïve Bayes classifier with feature vectors generated using Word2Vec modeling.

14 Claims, 6 Drawing Sheets

(51) Int. Cl.
  *G06N 5/02* (2006.01)
  *G06Q 30/00* (2012.01)
  *G06F 16/35* (2019.01)

(56) References Cited

U.S. PATENT DOCUMENTS

| | | |
|---|---|---|
| 2002/0091628 A1 | 7/2002 | Kunimatsu |
| 2014/0372886 A1 | 12/2014 | Ramasubramanian |
| 2015/0293917 A1 | 10/2015 | Bufe et al. |
| 2015/0317383 A1* | 11/2015 | Alkov .................. G06Q 50/00 707/738 |
| 2016/0170993 A1 | 6/2016 | Katz et al. |
| 2017/0039196 A1 | 2/2017 | Banerjee |
| 2017/0132288 A1 | 5/2017 | Ho et al. |
| 2017/0255700 A1 | 9/2017 | Shiffman et al. |
| 2017/0322682 A1 | 11/2017 | Humayun et al. |
| 2018/0365321 A1* | 12/2018 | Ke ....................... G06N 3/0445 |
| 2019/0019233 A1* | 1/2019 | Bhowmick ........... H04L 67/306 |
| 2019/0311064 A1* | 10/2019 | Chakraborty ......... G06F 16/355 |
| 2020/0026773 A1* | 1/2020 | Verstraete ............. G06F 40/268 |
| 2020/0034442 A1* | 1/2020 | Larson .................. G06Q 50/01 |
| 2020/0065383 A1* | 2/2020 | Hadi .................... G06N 3/0445 |
| 2020/0066397 A1* | 2/2020 | Rai ....................... G06N 20/00 |

OTHER PUBLICATIONS

IBM Watson Financial, "Deployment topology" [online], retrieved on Nov. 21, 2018, from the Internet URL: https://www.ibm.com/support/knowledgecenter/en/SSCKRH_1.0.1/fcdd/c_component_architecture.html.

Machine Learning Mastery, "Naive Bayes for Machine Learning" [online], retrieved on Nov. 21, 2018,from the Internet URL: https://machinelearningmastery.com/naive-bayes-for-machine-learning/.

Tensorflow, "Vector Representations of Words" [online], retrieved on Nov. 21, 2018,from the Internet URL: https://www.tensorflow.org/tutorials/representation/word2vec.

* cited by examiner

CONTEXTUAL INTERESTINGNESS RANKING OF DOCUMENTS FOR DUE DILIGENCE IN THE BANKING INDUSTRY WITH TOPICALITY GROUPING

CROSS-REFERENCE TO RELATED APPLICATION

This application is related to U.S. patent application Ser. No. 13/198,708 entitled "CONTEXTUAL INTERESTINGNESS RANKING OF DOCUMENTS FOR DUE DILIGENCE IN THE BANKING INDUSTRY WITH ENTITY GROUPING" filed concurrently herewith, which is hereby incorporated.

STATEMENT REGARDING PRIOR DISCLOSURE BY THE INVENTORS

The subject matter of the present application was included in the implementation of a software product known as Financial Crimes Due Diligence FCI 1.0.2 release by the Watson™ Financial Services group of International Business Machines Corporation in December of 2017.

BACKGROUND OF THE INVENTION

Field of the Invention

The present invention generally relates to natural language processing, and more particularly to a method of ranking news articles or other natural language publications regarding a subject of interest.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp.

Natural language classifiers are commonly used in NLP systems to identify the type of discourse in connected text, e.g., a yes/no question, a content question, a statement, an assertion, etc. This service enables developers without a background in machine learning or statistical algorithms to create natural language interfaces for their applications. A natural language classifier (NLC) interprets the intent behind text and returns a corresponding classification with associated confidence levels. The return value can then be used to trigger a corresponding action, such as redirecting the request or answering a question. NLCs are typically tuned and tailored to short text (1000 characters or less) and can be trained to function in any domain or application. For example, the IBM Watson™ natural language classifier service applies deep learning techniques to make predictions about the best predefined classes for short sentences or phrases. Exemplary applications include responding to questions from users that would otherwise be handled by a live agent, categorizing text messages (SMS) as personal, work, or promotional, classifying tweets into a sets such as events, news, or opinions, and analyzing text from social media or other sources to determine whether it relates positively or negatively to an offering or service (sentiment).

Sentiment analysis is a particularly useful application of natural language processing. Sentiment analysis can involve various text analysis techniques. Text analysis can include annotation-based techniques using a text annotator program to search text documents and analyze them relative to a defined set of tags. The text annotator can then generate linguistic annotations within the document to extract concepts and entities that might be buried in the text, such as extracting person, location, and organization names or identifying positive and negative sentiment (polarity). Standardized lexicons are available that provide numerical polarity values for various words. Different algorithms can then be used to gauge the overall sentiment of a natural language statement. Other forms of text analysis include parsing the linguistic structure of the text, and learning patterns in the text through machine learning algorithms.

SUMMARY OF THE INVENTION

The present invention in at least one embodiment is generally directed to a method of ranking documents according to contextual interestingness by receiving a document to be analyzed in computer-readable form, receiving a subject of interest and a category of interest which is independent of the subject of interest, classifying the document to determine that it belongs to the category of interest, identifying at least one entity in the document that corresponds to the subject of interest, grouping passages from the document that relate to the entity, analyzing the passages for sentiment to generate a sentiment score for each passage, and ranking the document based on the sentiment scores. Multiple documents can be so processed to yield a rank order of the documents according to interestingness. The ranking can order the documents based on a descending order of absolute values of the sentiment scores. In one application the invention is used for detecting financial improprieties, and a subset of the documents can be selected for financial impropriety analysis according to the rank order, followed by the financial impropriety analysis which can determine that a potential financial impropriety situation exists, and responsively taking action with regard to the potential impropriety. In one implementation the classifying utilizes multiple natural language text classifiers each of which provides a decision as to a most likely category out of a plurality of available categories for a given passage, and the category of interest is a mode of the decisions from all of the natural language text classifiers. One of the natural language text classifiers is preferably a naïve Bayes classifier with feature vectors generated using Word2Vec modeling. Available categories might be a set of positive categories including at least Prospecting, Political Exposure, Background, and Beneficial Ownership, and a set of negative categories including at least Adverse Press, Sanctions, Litigation, and Narcotics.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
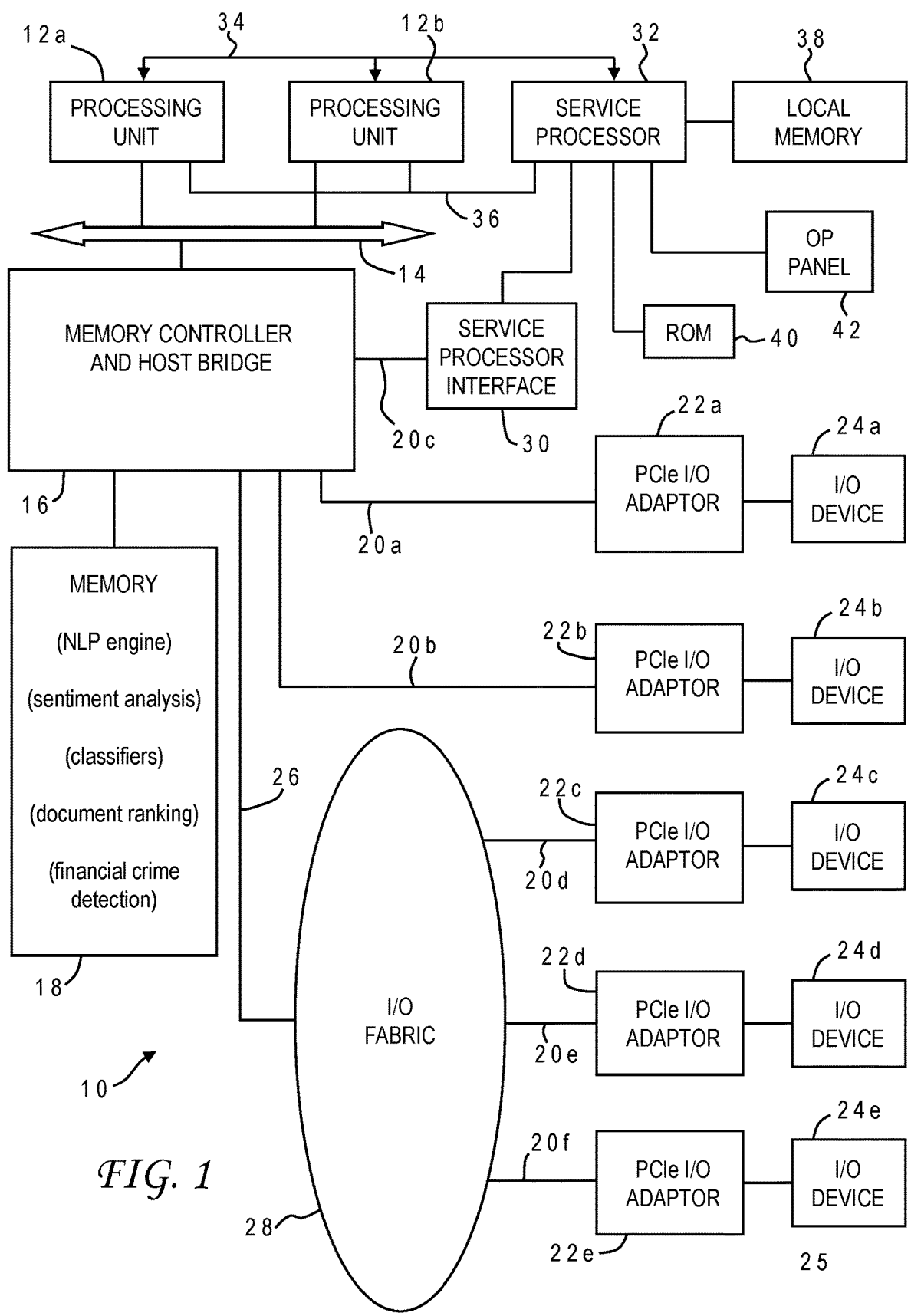
FIG. 1 is a block diagram of a computer system programmed to carry out ranking of documents for a subject of interest in accordance with one implementation of the present invention.

In the banking industry, due diligence (also referred to as "Know Your Customer") is an important process used during the onboarding of a new customer as well as for periodic monitoring of existing customers. In addition to standard documentation, bank analysts are increasingly viewing news websites (e.g., BBC, Daily Mail) and news databases or aggregators (e.g., Factiva, Google News, Bing News) as important sources of information about individuals and organizations they do business with (or might). In particular banks want to screen potential high-networth individual (HNI) customers using these information sources. One problem that banks face is the large number of potential documents to review. For instance, if there are a hundred or so articles about John Doe, it becomes very time consuming to analyze all of the passages, whether manually or using a cognitive system, and this limitation is amplified by the often high number of entities that a bank wishes to monitor. To compound the problem, the interestingness (relevance) of an article with respect to a given subject of interest (SOI) could be different for different categories. The category forms the context in which the interestingness of an article is measured for an SOI. For example, an article that ranks high for John Doe in an Adverse Press category may rank low in a Litigation category.

It would, therefore, be desirable to devise a method of rank-ordering news articles and the like pertaining to a given SOI. It would be further advantageous if the method could allow an organization to view information in an orderly manner regarding an SOI in terms of various categorical perspectives, e.g., Adverse Press, Sanctions, Litigation, Narcotics, Prospecting, Political Exposure, Background, or Beneficial Ownership. The present invention in its various embodiments achieves these and other advantages by examining the topicality and sentiment present in an article for a given SOI. The invention can infer underlying subtextual semantics of a document, and use them for ranking documents in the context of a given SOI and a given due diligence dimension. While the invention may be practiced in sundry ways, there are two primary approaches. In the first of these, for each document, the ranking system determines whether the document belongs to the topic of a given category. For example, determining whether a given article is about the topic of Adverse Press. This topicality is determined irrespective of any entity or SOI. The determination may be made via text classification. For each document within a category, all sentences are parsed and passages are formed by grouping them by the named entity mentioned in them (including coreferences). Thus, there will be one passage for each unique named entity within a document. Then, for each passage, the positive and negative sentiment scores are determined, yielding the sentiment polarity for each unique named entity in a document. At runtime, given an SOI and a category, a document that mentions the SOI is ranked depending on the sentiment polarity for the SOI in that article. For "negative" categories such as Adverse Press, Sanctions, Litigation, and Narcotics, documents are ranked in descending order of absolute values of negative polarity scores. For "positive" categories such as Prospecting, Political Exposure, Background, and Beneficial Ownership, documents are ranked in descending order of positive polarity scores. In the second approach, for each document, the ranking system parses all sentences and forms passages by grouping them by the named entity mentioned in them (including coreferences). For each passage, the system determines the extent to which the passage belongs to the topic of each category. For example, it determines the probability that a given passage (group of sentences about a unique named entity) from a given article is about the topic of Adverse Press. This determination gives the topicality for each unique named entity mentioned in a document. For each passage, the system also determines the positive and negative sentiment scores, yielding the sentiment polarity for each unique named entity in a document. At runtime, given an SOI and a category, the system ranks a document that mentions the SOI as a function of the following parameters (i) the sentiment polarity for the SOI in that document, and (ii) the probability of the SOI's passage from that document belonging to the given category. For the first parameter, negative categories again use the absolute values of negative polarity scores, and positive categories use the positive polarity scores. The present invention thereby represents a significant improvement in a technological field, namely, natural language processing, and particularly the ability of a human user to efficiently sift through potentially thousands of documents to find the ones that are likely the most important to the subject at hand.

With reference now to the figures, and in particular with reference to FIG. 1, there is depicted one embodiment 10 of a computer system in which the present invention may be implemented to carry out the ranking of documents for sentiment analysis. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as a natural language processing (NLP) engine, a sentiment analysis module, one or more classifiers, a document ranking module, and a financial impropriety detection module, i.e., for detecting financial crimes or other financial irregularities. Financial crimes may involve, without limitation, fraud (checking account fraud, credit card fraud, mortgage fraud, medical fraud, corporate fraud, securities fraud, bank fraud, insurance fraud, market manipulation, payment (point of sale) fraud, health care fraud), theft, scams or confidence tricks, tax evasion, bribery, embezzlement, identity theft, money laundering, and forgery and counterfeiting.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the document ranking application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a document ranking process that uses novel natural language processing techniques to manage large numbers of documents to be analyzed. Accordingly, a program embodying the invention may additionally include conventional aspects of various natural language processing and text analysis tools, and these details will become apparent to those skilled in the art upon reference to this disclosure.

Figure 2:
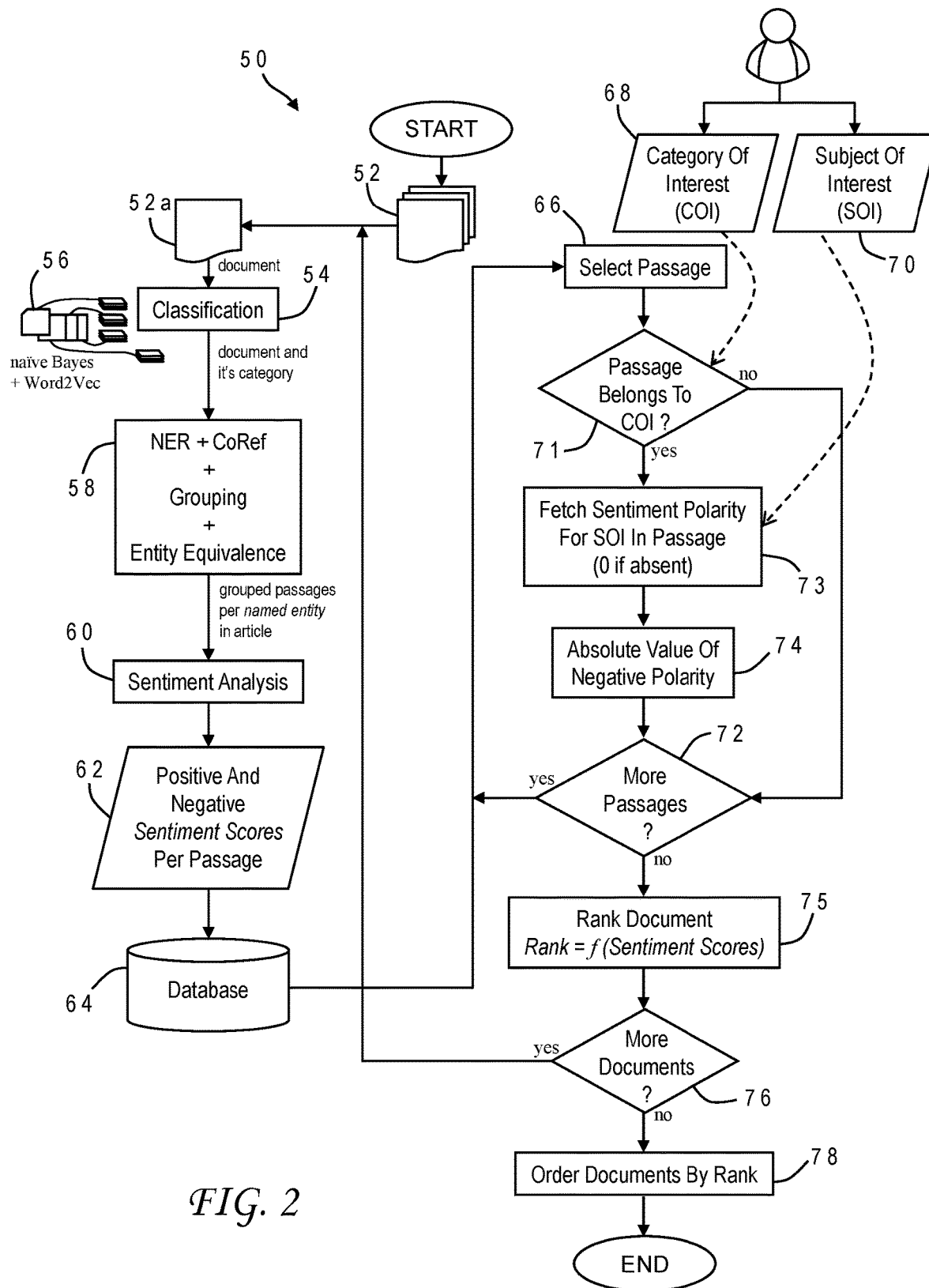
FIG. 2 is a chart illustrating the logical flow for a document ranking process in accordance with one implementation of the present invention.

Referring now to FIG. 2, there is depicted a chart illustrating the logical flow for a document ranking process 50 in accordance with one implementation of the present invention. Process 50 may be carried out using any computer system, such as computer system 10, and begins by receiving a batch 52 of multiple electronic documents to analyze in computer-readable form. The documents may be provided in any convenient format. Documents 52 may be manually curated, automatically received via subscription services, or discovered by crawling through various news sources. Each document may be assigned a unique identifier, i.e., id number. One of the documents 52a is selected for processing, and is subjected to text classification 54 to determine its category. This topicality is determined irrespective of any subject of interest. As noted in the Background, natural language classifiers are known in the art, and any conventional classification technique can be employed to determine the category of document 52a. In the preferred implementation, three classifiers 56 are used, that is, classifiers trained with three different models. Two of these models, support vector machines and random forest learning, are trained using snippets of article text relevant to each class, with term frequency-inverse document frequency (TF-IDF) vectors acting as feature vectors. As the training data is highly topical, these model exhibit high precision and recall even though the features are simply represented as TF-IDF. The third model, naïve Bayes technique, is trained on entire article contents, with feature vectors being generated using Word2Vec modeling. Naïve Bayes assumes that words occur independently of one another (long accepted as a naïve assumption) yet, such an assumption serves its purpose by speeding up the computation of a Bayes model. Word2Vec, on the other hand, helps discover the inherent contextual interdependence between words in text. It is a neural network based technique for learning vector representation of words, and helps discover meaningful subspaces occupied by related words in a term space. A Word2Vec model that has been pre-trained on news articles can be used for feature generation in conjunction with naïve Bayes as a classifier, the former essentially helping mitigate the naïve independence assumption of the latter. High precision and recall has also been observed with this combined model. The preferred implementation uses all three of these classifiers to form an ensemble. The decision of the ensemble can be computed based on any convenient method, such as using the mode of the decisions made by the individual classifiers or the class that has the highest sum of confidences of the individual classifiers.

Returning to FIG. 2, the category of document 52a is thus determined using classification. Available categories can be chosen by the system designer, and can for example include those positive and negative categories mentioned above, but those should not be construed in a limiting sense as other categories can be designated. The document then undergoes additional text analysis 58 including named-entity recognition (NER) to identify all the named entities, including co-references to named entities. NER can also be performed conventionally such as using a statistical machine learning model available in spaCy for parsing and entity recognition. Co-references to named entities can be resolved using a neural network based model named NeuralCoref, a pipeline extension for spaCy. For each resolved named entity, the system identifies sentences mentioning that named entity (including its resolved co-references), and groups these sentences together into a passage Named entities are preferably de-duplicated, e.g., "John Doe", "J Doe", and "John C Doe" are all normalized to "John Doe" (entity equivalence).

At this point in the flow of FIG. 2, the ranking system has grouped passages per named entity in the article/document, which are then subjected to sentiment analysis 60, resulting in positive and negative sentiment polarity scores per passage 62. This indicates the sentiment within the document for the named entity to which the passage belongs. The polarity of a given word (a numerical value) can be determined using any predefined lexicon, such as those described by Pavlopoulos in his thesis "ASPECT BASED SENTIMENT ANALYSIS" found at Internet URL http://www2.aueb.gr/users/ion/docs/pavlopoulosphd thesis.pdf, by SentiWordNet at Internet URL http://sentiwordnet.isti.cnr.it, or by the Natural Language Toolkit Project at Internet URL http://www.nitk.org. The tuple of named entity, document id, category, positive polarity score and negative polarity score is stored in a database 64. A first passage of the document from database 64 is selected for further examination 66. The ranking system receives a category of interest (COI) 68 and a subject of interest (SOI) 70 from the user, and checks to see if the current passage belongs to the COI 71. If not, the system checks for more passages 72 and resumes iteratively at box 66. If the passage is in the COI, the system fetches the sentiment polarity for the SOI in the passage 73 (which may be zero, i.e., no sentiment found for the subject). For negative categories, the absolute value 74 of the polarity is used. The process again iterates at box 66 as long as there are more passages to be examined 72. Once all passages for the document are processed, it is assigned a rank based on a function of the passage sentiment scores 75. The function may vary by implementation; for example, the rank may be a sum of sentiment scores. If more documents remain 76, the process returns iteratively to 52a to analyze other documents. Once all documents in the batch 52 have been processed, they are ordered according to rank for a given SOI and category, preferably in descending order of the ranks 78.

Those skilled in the art will appreciate that the same document may belong to different categories and may carry different sentiment polarities depending on the context, i.e., depending on who the subject of interest is. For example, a news article may contain mentions and text about two individuals A and B. If the document is considered overall, then the class/category of the document as well as its sentiment will be dictated by text pertaining to both A and B. However, in the case where only A is the subject of interest, B is not relevant in this context, so the method will only collate sentences that pertain to A in the document, and those collated passage are then used for classification and sentiment analysis.

Figure 3:
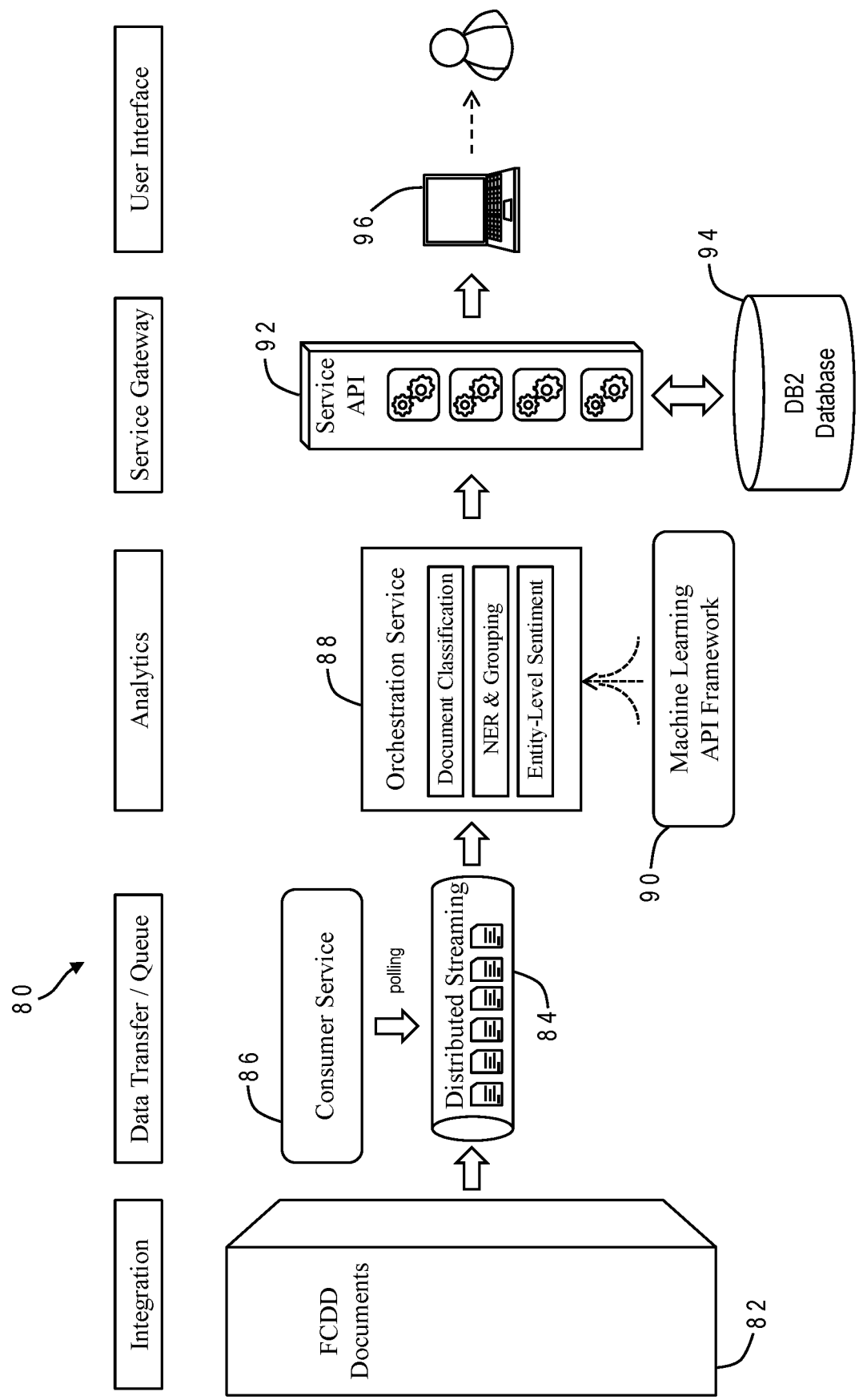
FIG. 3 is a high-level architecture diagram providing a systemic perspective of how a ranking engine is developed in accordance with one implementation of the present invention.

FIG. 3 is a high-level architecture diagram providing a systemic perspective 80 of how the ranking engine can be developed in a cognitive financial crimes due diligence (FCDD) product using this approach. The system can be thought of as five components or areas, those being integration, data transfer/queue, analytics, a service gateway, and the user interface. The integration aspect includes the FCDD documents 82 procured by whatever means, having information pertaining to the categories and subjects of interest. The data transfer/queue aspect includes a distributed streaming service 84 such as Apache's Kafka product which provides a unified, high-throughput, low-latency platform for handling real-time data feeds. Distributed streaming service 84 receives the FCDD documents 82 and polling information from a consumer service 86. Data streaming is advantageous in cases where the application needs data sources to be constantly monitored (e.g., social media, news aggregators) for any updates, particularly if the entities are widely known corporates who might be in news for periodic press releases, announcements, etc. A machine learning API framework 90 feeds into an orchestration service 88 as part of the analytics to provide natural language processing facilities such as document classification, named-entity recognition, and sentiment analysis. This refined data can then be used by various service APIs 92 (such as a financial crimes detection module, or other Know-Your-Customer interfaces) and catalogued in a database 94, forming the service gateway. Database 94 may be a DB2 database, comprising a relational database management system. DB2 databases are designed to store, analyze and retrieve data more efficiently, and can be extended with the support of object-oriented features and non-relational structures with an extensible markup language (XML). Results are then provided to the user interface, e.g., a user computer system 96.

Figure 4:
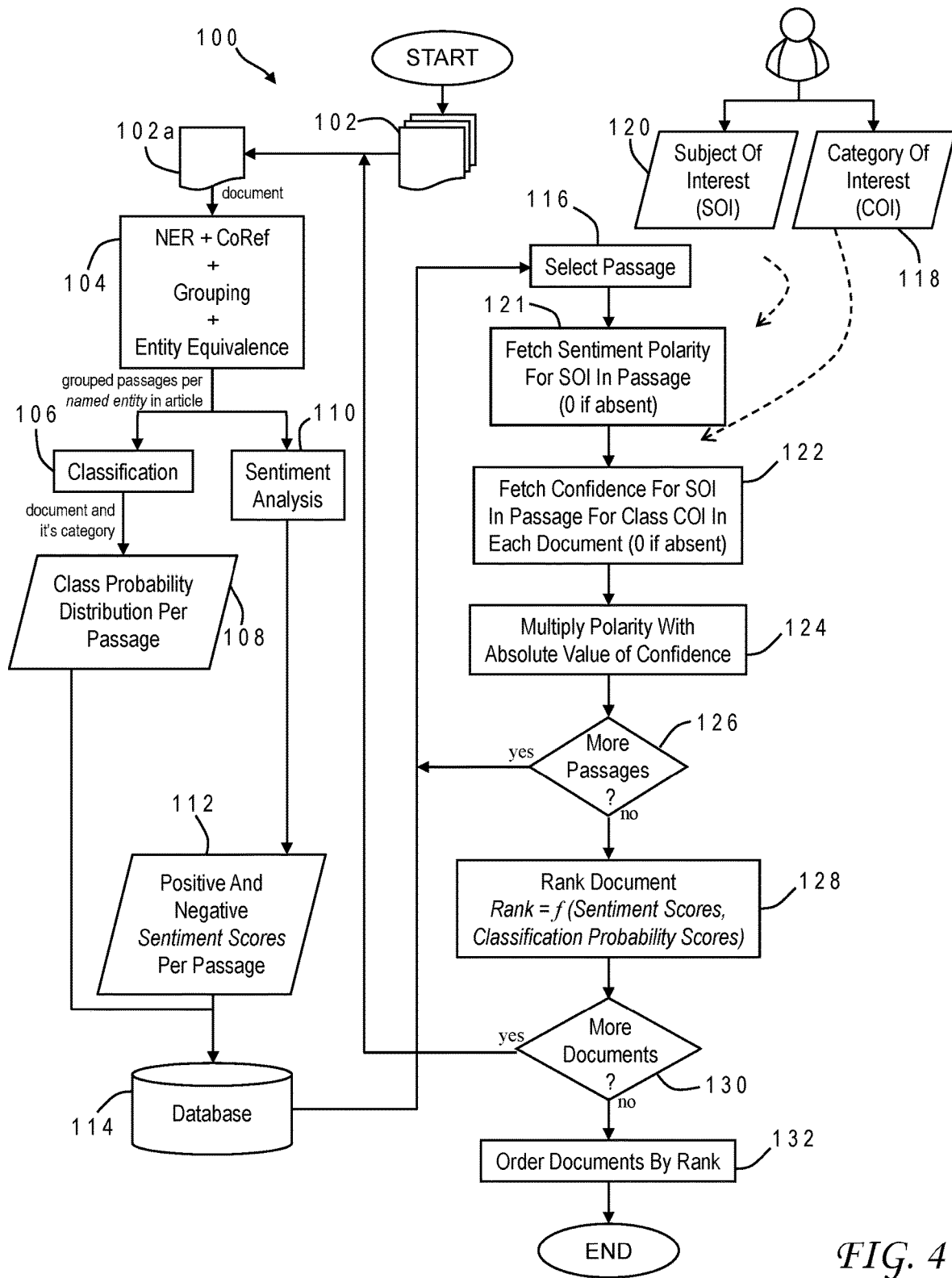
FIG. 4 is a chart illustrating the logical flow for a document ranking process in accordance with another implementation of the present invention.

FIG. 4 is a flow chart similar to FIG. 2 but illustrating an alternative document ranking process 100 in accordance with the second primary approach of the present invention Several steps in the process are similar to those in process 50 of FIG. 2 and can be understood in light of the previous description. Process 100 again begins with a set of documents 102 to be considered, and selection of a first one of the documents 102a for processing. According to this implementation, the document first undergoes named-entity recognition including co-references, grouping, and entity equivalence 104 as described above, resulting in passages which are grouped per named entity in an article/document. Process 100 bifurcates at this point into two parallel subprocesses. One subprocess subjects the document to multi-label classification 106 to yield a class (category) probability distribution per passage 108, i.e., the probability or confidence (e.g., a percentage) that a given passage should be included in a particular one of the various available categories. The other subprocess subjects the document to sentiment analysis 110 to yield positive and negative sentiment scores per passage 112, i.e., the sentiment within the document for the named entity to which the passage belongs. The resulting tuple of named entity, document id, category probability distribution, positive polarity score and negative polarity score is stored in a database 114. This overall record could be stored either in a normalized database or in a denormalized one.

A first passage of the document from database 114 is selected for further examination 116. The ranking system receives a category of interest (COI) 118 and a subject of interest (SOI) 120 from the user, and fetches the sentiment polarity for the SOI in the passage 121 (which again may be zero, i.e., no sentiment found for the subject). The system further fetches the confidence value for the SOI passage being in the COI 122, i.e., the probability that the passage pertaining to a particular entity belongs to the COI (which may also be zero, i.e., the passage had no probability of being in the COI). For a given SOI and category, an adjusted sentiment score is then computed for each document as the product of class confidence and the absolute value of the sentiment score 124. For some categories (e.g., Political Exposure, Background, or Beneficial Ownership), the sentiment polarity may optionally be ignored, ranking the documents only using the class confidence. The process returns iteratively to box 116 as long as there are more passages to be examined 126. Once all passages for the document are processed, it is assigned a rank based on a function of the adjusted sentiment scores 128. The precise function may again vary according to designer preference. If more documents remain 130, the process again returns iteratively to the next document 102a. Once all documents in the batch have been processed, they are ordered according to rank for a given SOI and category 132.

Figure 5:
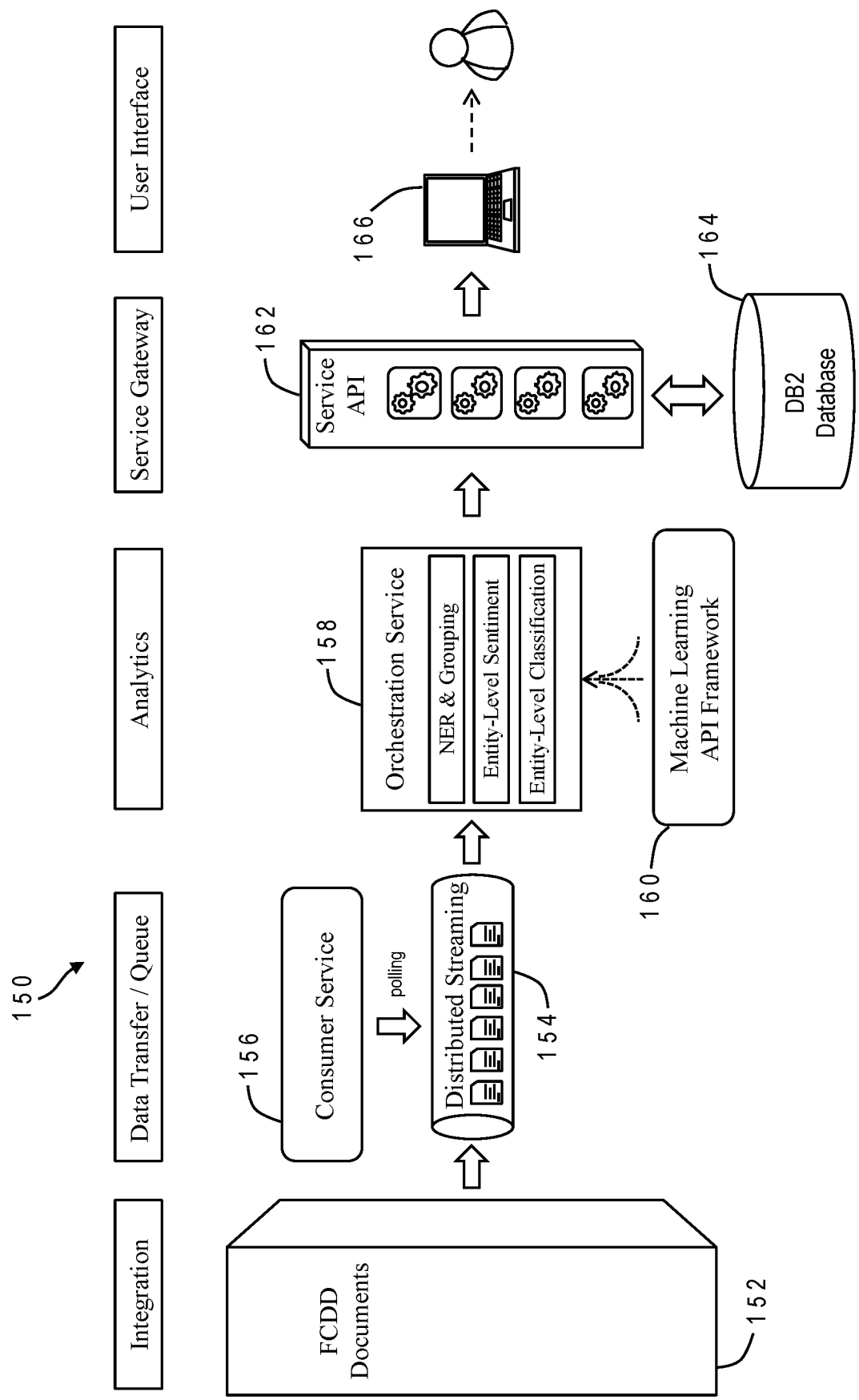
FIG. 5 is a high-level architecture diagram providing a systemic perspective of how a ranking engine is developed in accordance with another implementation of the present invention.

FIG. 5 is a high-level architecture diagram providing a systemic perspective 80 of how the ranking engine can be developed in another cognitive FCDD product using this second approach. Many components in FIG. 5 are the same as those in FIG. 3 and can be understood in light of the previous description. The integration portion of the system again uses the FCDD documents 152 having information pertaining to the categories and subjects of interest. Distributed streaming service 154 receives the FCDD documents 152 and polling information from a consumer service 156. Another machine learning API framework 160 feeds into an orchestration service 158 but in this implementation the natural language processing facilities including entity-level classification, entity-level sentiment analysis, and named-entity recognition. The refined data is used by various service APIs 162 (such as a financial crimes detection module, or other Know-Your-Customer interfaces) and catalogued in a DB2 database 164. Results are then provided to the user interface, e.g., a user computer system 166.

Figure 6:
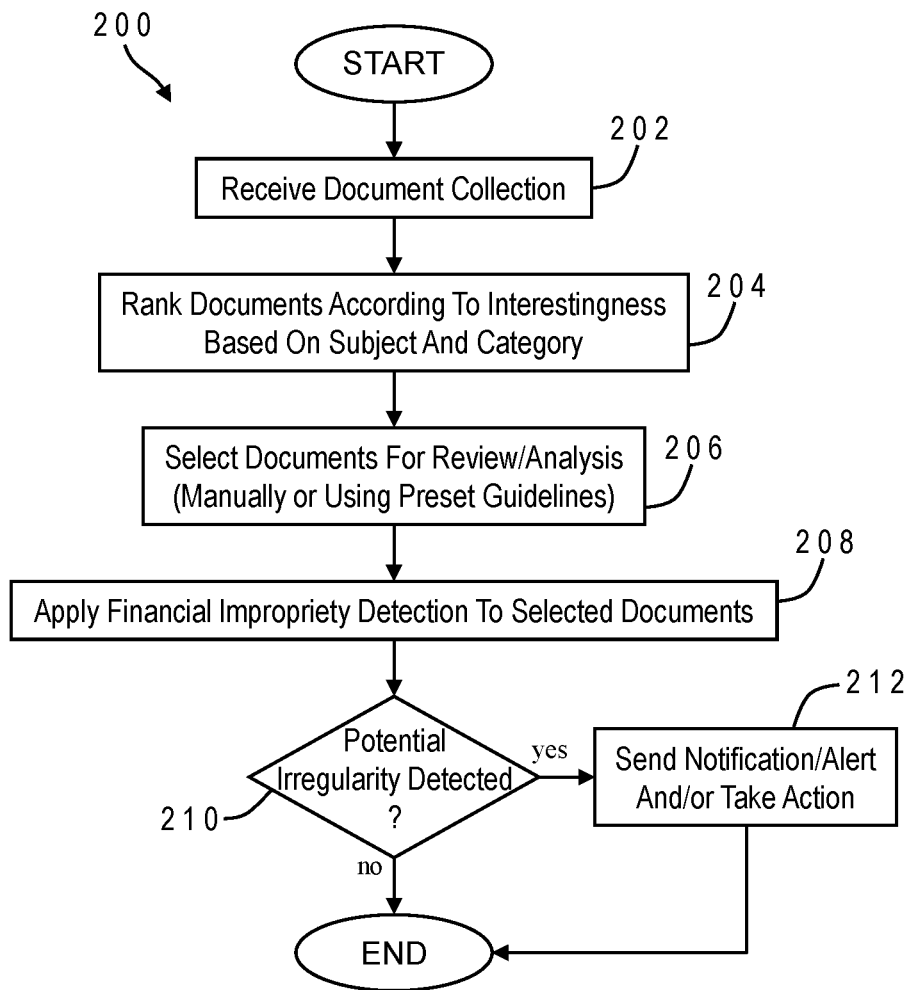
FIG. 6 is a chart depicting a financial impropriety detection process which uses contextual interestingness ranking in accordance with one implementation of the present invention.

The present invention may be further understood with reference to the chart of FIG. 6 which illustrates the logical flow for a financial impropriety detection process 200 in accordance with one implementation of the present invention. Process 200 may again be carried out in any convenient computer system, such as computer system 10, and begins by receiving a collection of documents to be analyzed 202. The documents are ranked by interestingness according to one of the foregoing approaches 204. A set of the documents is then selected for further review/analysis based on the ranking 206. The selection of documents may be manual, i.e., by an analyst, or may be automated using preset guidelines. For example, the system may be programmed to look at no more than a maximum number of documents (e.g., twenty), or to look at documents that only have a rank (interestingness score) above some predetermined threshold set by the system designer. Conventional financial impropriety detection can then be applied to the selected documents 208; see for example the IBM Financial Crimes Due Diligence with Watson service described at internet URL https://www.ibm.com/support/knowledgecenter/en/SS-CKRH_1.0.1/fcdd/c_component_ar chitecture.html. If no potential impropriety is detected 210, the process ends. If a potential impropriety is detected, the system responsively takes action such as generating an alert or flagging an account, or more serious intervention 212. In the simplest implementation an alert is generated to flag certain activity or an account as being suspicious and requiring further review by an analyst. The alert can be sent via any convenient method, such as a phone call or short message service (SMS) text to the analyst or investigator, or an email notification. More serious intervention can include a denial of privileges (e.g., suspending a bank or credit card account), or a referral to a criminal investigative unit.

The present invention thereby provides a superior solution to contextual interestingness ranking of documents based on sentiment analysis and classification at the level of entities within document text, particularly useful for due diligence requirements. Sentiment analysis can be performed at the entity level within the document text rather than at the level of the entire document, and used for ranking documents in the context of a particular entity.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to financial crimes detection for the banking industry, but it is equally applicable to any analysis involving sentiment in other contexts. Other pertinent applications include due diligence for vendor selection or customer onboarding (checking if a vendor or customer has ownership issues, financial risks, outlook within the industry, etc.), and risk rating of companies based on sections indicated for financial crimes due diligence. It is therefore contemplated that such modifications can be made without departing from the spirit or scope of the present invention as defined in the appended claims.

What is claimed is:

1. A method of ranking documents according to contextual interestingness comprising:
receiving a document to be analyzed in computer-readable form, by executing first instructions in a computer system;
receiving a subject of interest and a category of interest which is independent of the subject of interest, by executing second instructions in the computer system;
classifying the document to determine that it belongs to the category of interest, by executing third instructions in the computer system, wherein said classifying is carried out by a machine learning service which utilizes multiple natural language text classifiers each of which provides a decision as to a most likely category out of a plurality of available categories for a given passage, the category of interest is a mode of the decisions from all of the natural language text classifiers, and at least one of the natural language text classifiers is a naïve Bayes classifier with feature vectors generated using Word2Vec modeling;

identifying at least one entity in the document that corresponds to the subject of interest, by executing fourth instructions in the computer system;

grouping passages from the document that relate to the entity, by executing fifth instructions in the computer system;

analyzing the passages for sentiment to generate a sentiment score for each passage, by executing sixth instructions in the computer system; and ranking the document based on the sentiment scores, by executing seventh instructions in the computer system.

2. The method of claim 1 wherein multiple documents are received and said classifying results in a set of the documents which belong to the category of interest, and further comprising repeating said identifying, said grouping, said analyzing and said ranking for each document in the set of documents to yield a rank order of the set of documents according to interestingness.

3. The method of claim 2 wherein said ranking orders the documents based on a descending order of absolute values of the sentiment scores.

4. The method of claim 2 further comprising:
selecting a subset of the set of documents for financial impropriety analysis according to the rank order;
applying financial impropriety analysis to the subset to determine a potential financial impropriety; and
responsively sending an alert regarding the potential financial impropriety to an investigator.

5. The method of claim 1 wherein the available categories comprise a set of positive categories including at least Prospecting, Political Exposure, Background, and Beneficial Ownership, and a set of negative categories including at least Adverse Press, Sanctions, Litigation, and Narcotics.

6. A computer system comprising:
one or more processors which process program instructions;
a memory device connected to said one or more processors; and
program instructions residing in said memory device for ranking documents according to contextual interestingness by receiving a document to be analyzed in computer-readable form, receiving a subject of interest and a category of interest which is independent of the subject of interest, classifying the document to determine that it belongs to the category of interest wherein the classifying is carried out by a machine learning service which utilizes multiple natural language text classifiers each of which provides a decision as to a most likely category out of a plurality of available categories for a given passage, the category of interest is a mode of the decisions from all of the natural language text classifiers, and at least one of the natural language text classifiers is a naïve Bayes classifier with feature vectors generated using Word2Vec modeling, identifying at least one entity in the document that corresponds to the subject of interest, grouping passages from the document that relate to the entity, analyzing the passages for sentiment to generate a sentiment score for each passage, and ranking the document based on the sentiment scores.

7. The computer system of claim 6 wherein multiple documents are received and the classifying results in a set of the documents which belong to the category of interest, and said program instructions further repeat the identifying, the grouping, the analyzing and the ranking for each document in the set of documents to yield a rank order of the set of documents according to interestingness.

8. The computer system of claim 7 wherein the ranking orders the documents based on a descending order of absolute values of the sentiment scores.

9. The computer system of claim 7 wherein said program instructions further select a subset of the set of documents for financial impropriety analysis according to the rank order, apply financial impropriety analysis to the subset to determine a potential financial impropriety, and responsively send an alert regarding the potential financial impropriety to an investigator.

10. The computer system of claim 6 wherein the available categories comprise a set of positive categories including at least Prospecting, Political Exposure, Background, and Beneficial Ownership, and a set of negative categories including at least Adverse Press, Sanctions, Litigation, and Narcotics.

11. A computer program product comprising:
a computer readable storage medium; and
program instructions residing in said storage medium for ranking documents according to contextual interestingness by receiving a document to be analyzed in computer-readable form, receiving a subject of interest and a category of interest which is independent of the subject of interest, classifying the document to determine that it belongs to the category of interest wherein the classifying is carried out by a machine learning service which utilizes multiple natural language text classifiers each of which provides a decision as to a most likely category out of a plurality of available categories for a given passage, the category of interest is a mode of the decisions from all of the natural language text classifiers, and at least one of the natural language text classifiers is a naïve Bayes classifier with feature vectors generated using Word2Vec modeling, identifying at least one entity in the document that corresponds to the subject of interest, grouping passages from the document that relate to the entity, analyzing the passages for sentiment to generate a sentiment score for each passage, and ranking the document based on the sentiment scores.

12. The computer program product of claim 11 wherein multiple documents are received and the classifying results in a set of the documents which belong to the category of interest, and said program instructions further repeat the identifying, the grouping, the analyzing and the ranking for each document in the set of documents to yield a rank order of the set of documents according to interestingness.

13. The computer program product of claim 12 wherein the ranking orders the documents based on a descending order of absolute values of the sentiment scores.

14. The computer program product of claim 12 wherein said program instructions further select a subset of the set of documents for financial impropriety analysis according to the rank order, apply financial impropriety analysis to the subset to determine a potential financial impropriety, and responsively send an alert regarding the potential financial impropriety to an investigator.

* * * * *